(12) United States Patent
Davies

(10) Patent No.: US 6,496,774 B1
(45) Date of Patent: Dec. 17, 2002

(54) AUTOMATIC VEHICLE ROUTING AND RECOMMENDATION SYSTEM

(75) Inventor: F. Bryan Davies, Vienna, VA (US)

(73) Assignee: PRC Inc., McLean, VA (US)

( * ) Notice: Subject to any disclaimer, the term of this patent is extended or adjusted under 35 U.S.C. 154(b) by 0 days.

(21) Appl. No.: 09/863,874

(22) Filed: May 24, 2001

(Under 37 CFR 1.47)

(51) Int. Cl.[7] ............................................. G01C 21/00
(52) U.S. Cl. ..................... 701/200; 73/178 R; 340/990; 340/995
(58) Field of Search ..................... 701/200; 73/178 R; 340/990, 995

(56) References Cited

U.S. PATENT DOCUMENTS

| | | | | |
|---|---|---|---|---|
| 6,023,655 A | * | 2/2000 | Nomura | ....................... 340/990 |
| 6,263,276 B1 | * | 7/2001 | Yokoyama et al. | .......... 340/988 |
| 6,282,492 B1 | * | 8/2001 | Gorai et al. | ................. 701/209 |
| 6,347,280 B1 | * | 2/2002 | Inoue et al. | ................. 340/910 |
| 6,351,707 B1 | * | 2/2002 | Ichikawa | ..................... 340/994 |

* cited by examiner

Primary Examiner—William A. Cuchlinski, Jr.
Assistant Examiner—Olga Hernandez
(74) Attorney, Agent, or Firm—Lowe Hauptman Gilman & Berner, LLP

(57) ABSTRACT

The present invention relates generally to automatic vehicle navigational systems, and more particularly, to an automatic vehicle routing and recommendation system. Even more particularly, the present invention is directed to a system for choosing one of a plurality of potential vehicles in a fleet for routing the fleet vehicle over the shortest distance and/or time from a current location to a target point such as a fire or a passenger for a taxicab.

11 Claims, 3 Drawing Sheets

Adjacency List

| Index Δ | Node Numbers | | | Adjacent ΔS | | |
|---|---|---|---|---|---|---|
| | 0 | 1 | 2 | | | |
| Δ0 | 0 | 1 | 2 | 1 | | |
| Δ1 | 0 | 1 | 2 | 0 | 2 | 3 |
| Δ2 | 0 | 1 | 2 | 1 | 4 | |
| Δ3 | 0 | 1 | 2 | 1 | 5 | |
| Δ4 | 0 | 1 | 2 | 2 | 5 | |
| Δ5 | 0 | 1 | 2 | 3 | 4 | |

FIG. 3

AUTOMATIC VEHICLE ROUTING AND RECOMMENDATION SYSTEM

FIELD OF THE INVENTION

The present invention relates generally to automatic vehicle navigational systems, and more particularly, to an automatic vehicle routing and recommendation system. Even more particularly, the present invention is directed to a system for choosing one of a plurality of potential vehicles in a fleet for routing the fleet vehicle over the shortest distance and/or time from a current location to a target point such as a fire or a passenger for a taxicab.

BACKGROUND OF THE INVENTION

Systems exist for routing a vehicle, such as a taxicab or a fire truck, from a current location to a target location. However, such systems have the drawback that even with today's high speed computers, the systems are unable to route or recommend, in real time, which of a plurality of vehicles would be able to reach the target location first.

For example, there is a large effort called the Military Tracking System (MTS) for the logistical support of 40,000 vehicles. The 40,000 vehicles are tracked using known GPS technology. Many of these 40,000 vehicles are constantly moving and their locations are constantly dynamically changing. Potentially, there could be 40,000 changing positions per second.

This problem is due to the fact that this can be a mathematically difficult problem to solve. For example, if there are 40,000 vehicles moving around within a street set network having 100,000 segments that pose for a classical operations research optimization, a linear optimization problem. A matrix would be created having 100,000 street segments which would be a 100,000 by 100,000 matrix. Even though the matrix may be sparsely populated, it would be impossible to calculate which of the 40,000 vehicles could reach the target location in real time.

Classically, the matrix would have to be built and the matrix would be inverted. A lot of work goes into how the matrix is created and how to make the matrix efficient and how to do the matrix inversion efficiently.

Accordingly, a need exists in the art for a system and method for recommending a route for one of a plurality of vehicles to a target location which is determinable in real time.

SUMMARY OF THE INVENTION

It is, therefore, an object of the present invention to provide an algorithm which can be solved in real time for providing a recommendation and routing of one of a plurality of vehicles to a target location in the shortest time/distance.

It is a further object of the present invention to eliminate most of the mathematical processing needed to solve an algorithm for recommending and routing a vehicle to a target location where the vehicle is chosen from a plurality of vehicles in a fleet.

These and other objects of the present invention are achieved by a method of recommending which of a plurality of vehicles should be routed from a present location to a target location on a tessellated map plane. The tessellated map plane overlays a street network and are divided into a plurality of tessellations. A plurality of dynamically changing vehicle locations representing a location of a vehicle are continuously stored with each of the vehicle locations being a present location and being within one of the plurality of tessellations. For each of the plurality of vehicles, a next tessellation is determined adjacent the tessellation within which the vehicle is located. If the second location is not located within the next tessellation, a further tessellation is determined until a tessellation is determined including the target location. One of the plurality of vehicles is selected which would travel the shortest distance from the present location to the target location.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3 is an adjacency list for each of the tessellations in FIG. 2.

BEST MODE FOR CARRYING OUT THE INVENTION

A method and apparatus for automatically routing and recommending a vehicle to a target location are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
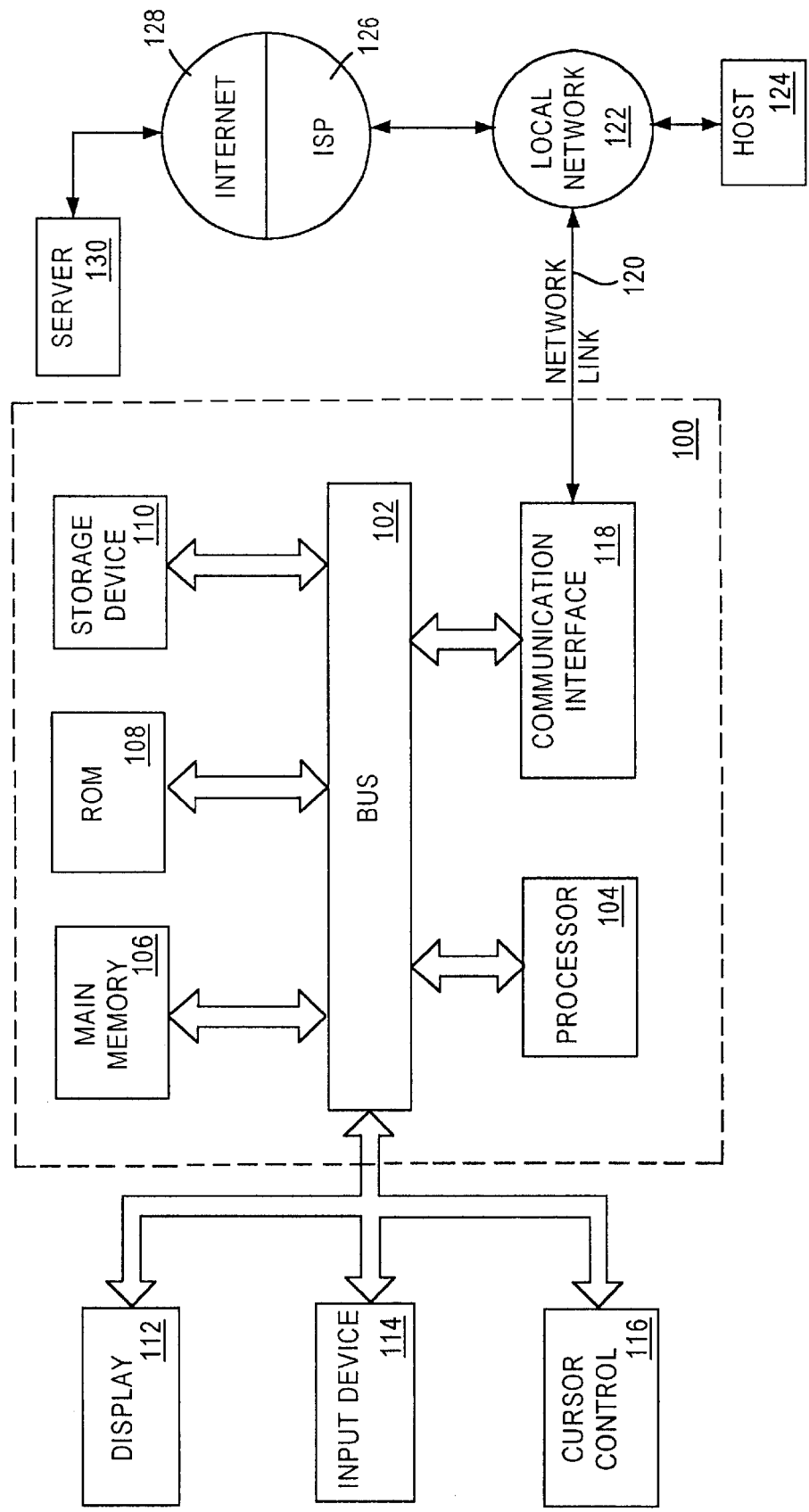
FIG. 1 is a high level block diagram of a computer architecture usable with the present invention.

FIG. 1 is a block diagram illustrating an exemplary computer system 100 upon which an embodiment of the invention may be implemented. The present invention is usable with currently available personal computers, mini-mainframes and the like. The computer system 100 can be a "presence" as described below.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,y) allowing the device to specify positions in a plane.

The invention is related to the use of a computer system 100, such as the illustrated system, to display automatically routing and recommending a vehicle to a target location. According to one embodiment of the invention, automatically routing and recommending a vehicle to a target location is provided by computer system 100 in response to processor 104 executing sequences of instructions contained in main memory 106. Such instructions may be read into main memory 106 from another computer-readable medium, such as a storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the current vehicle locations. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for automatically recommending a vehicle and routing the vehicle to a target location as described herein.

The received code may be executed by processor 104 as it is received, and/or stored in storage device 110, or other non-volatile storage for later execution. In this manner, computer system 100 may obtain application code in the form of a carrier wave.

The first step in the process is to determine the optical vehicle to recommend to be assigned to the target location. Typically, there is some incident occurring at the target location such as a fire. Thus, many of the potential vehicles are eliminated because there is a program called Automatic Vehicle Recommendation (AVR) which is the optimal vehicle to recommend to be assigned to the incident. For example, there may be a passenger at an airport and there needs to be a vehicle sent to pick that passenger up. There may be a fire and a fire truck may be needed and the fire may be on the $27^{th}$ floor so a vehicle is needed having a ladder that can reach the $27^{th}$ floor. After the appropriate vehicles have been selected, then there is a recommendation of a particular vehicle which will travel the shortest distance and/or time to the target location. Following the vehicle recommendation, there will be a precise routing of the vehicle from the current location to the target location.

Figure 2:
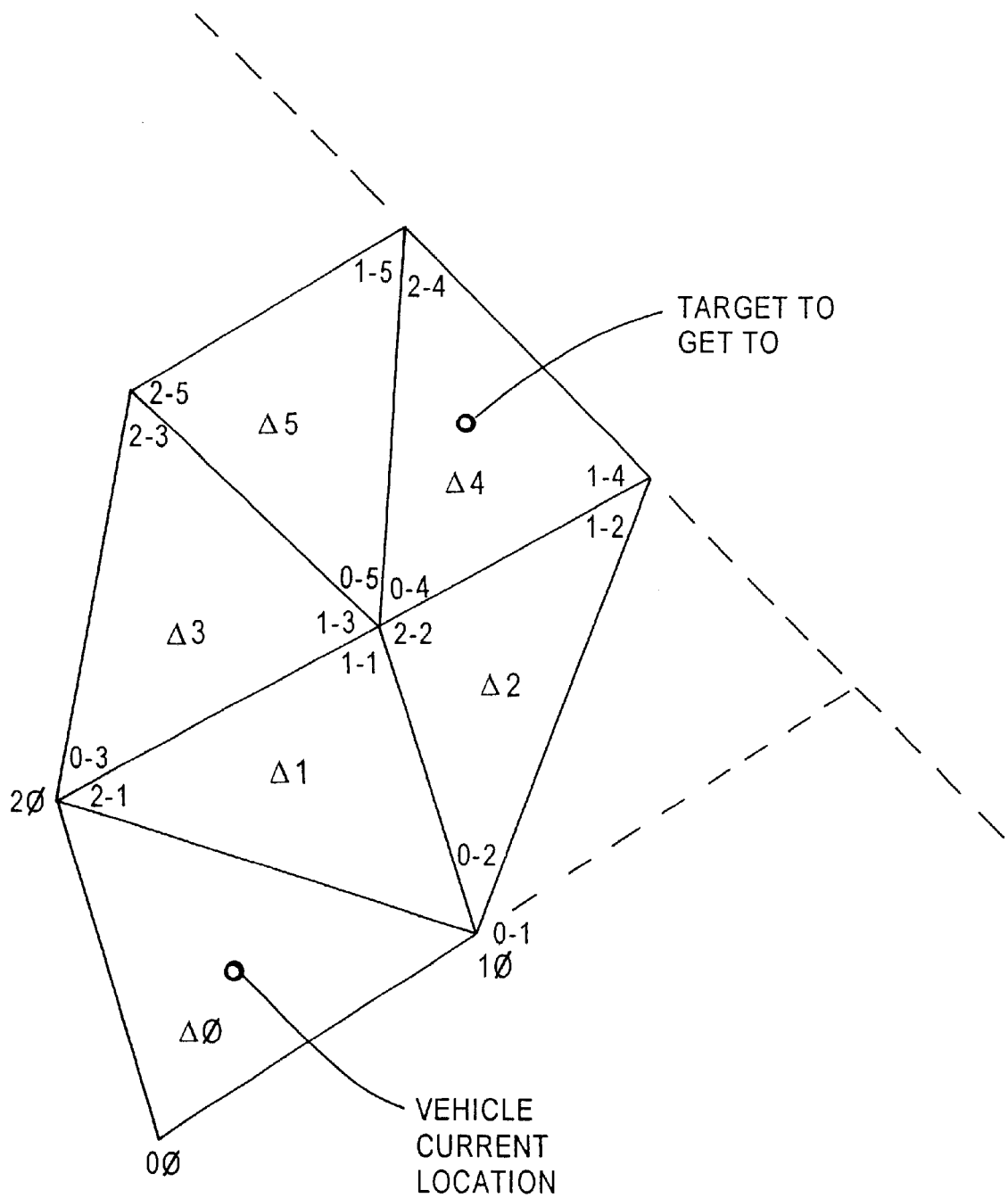
FIG. 2 is a high level schematic illustration of a geographic area divided into tessellations.

Referring specifically now to FIG. 2, a geographic area including a street network has been divided into a plurality of five tessellations. Preferably, the tessellations are triangles.

The vehicle positions are determined using conventional GPS signals provided by GPS satellites from GPS transmitters on each of the vehicles. The signals can be updated as frequently as once per second. The triangles illustrated in FIG. 2 form a triangulated network that uses a number of objects embedded in the map plane to construct the triangulated network and then there are properties associated with the triangulated network. The key criteria for building the triangles are that the street network allows the traversal from any triangle boundary to any other along the street network. Thus, for example, a bridge would form one side of the triangle and have a certain impedance. By contrast, a river would be bounded on either side by adjacent boundaries of triangles. There would be an impedance of one, meaning that that side of the triangle could not be crossed by a vehicle. Each triangle has a boundary and each boundary has an impedance associated with each boundary. The entire geographical region is piece-wise continuous meaning it is completely triangulated.

As depicted in FIG. 2, there are six triangles including triangle φ, triangle 1, triangle 2, triangle 3, triangle 4 and triangle 5. The automatic vehicle recommendation requires that the number of vehicles has already been sorted out by which vehicle would be appropriate for sending to the target location. As depicted in FIG. 2, the only current vehicle usable at the target location is located in triangle φ. The target location to get to is located in triangle 4. Triangle φ has three nodes including node 0, node 1 and node 2. Similarly, each of the triangles has three nodes including, for example, triangle 1 which has node 0-1, 1-1 and 2-1.

Referring now to FIG. 3, there is an adjacency list for each of the triangles depicted in FIG. 2.

Using the present invention to determine the shortest distance from the current vehicle, it depends on whether a point is to the left or to the right of the line. The line extends on to infinity.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of recommending which of a plurality of vehicles should be routed from a present location to a target location on a tessellated map plane, the tessellated map plane overlaying a street network and being divided into a plurality of tessellation's, comprising:

continuously storing a plurality of dynamically changing vehicle locations representing a location of a vehicle with each of the vehicle locations being a present location and being within one of the plurality of tessellations;

for each of the plurality of vehicles determining a next tessellation adjacent the tessellation within which the vehicle is located;

if the second location is not located within the next tessellation, determining a further tessellation until a tessellation is determined including the target location;

selecting which of the plurality of vehicles would travel the shortest distance from the present location to the target location.

2. The method of claim 1, wherein each of the tessellation includes a plurality of boundaries with adjacent tessellations sharing a common boundary.

3. The method of claim 1, comprising recommending the shortest route from the first location to the second location.

4. The method of claim 1, wherein each of the tessellations is a triangle.

5. The method of claim 2, wherein each of the plurality of boundaries has an impedance value associated therewith.

6. The method of claim 5, comprising calculating the shortest distance by adding each of the distances for each of boundaries and multiplying each of the distances by the impedance associated with the boundary.

7. The method of claim 5, wherein the impedance may be different depending on the direction of travel of the vehicle.

8. The method of claim 1, wherein the impedance for a barrier is infinite wherein the barrier is a river, railroad track.

9. The method of claim 1, wherein the method is performed in real time.

10. The method of claim 1, wherein each tessellation is evaluated in a clockwise manner.

11. The method of claim 5, wherein there is four impedance values for different times of the day.

* * * * *